(12) United States Patent
Gaikwad et al.

(10) Patent No.: US 10,915,510 B2
(45) Date of Patent: *Feb. 9, 2021

(54) METHOD AND APPARATUS OF COLLECTING AND REPORTING DATABASE APPLICATION INCOMPATIBILITIES

(71) Applicant: Bank of America Corporation, Charlotte, NC (US)

(72) Inventors: Deepak Gaikwad, Singapore (SG); Lai Fai Wong, Singapore (SG); Muthuraj Kumaresan, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,617

(22) Filed: Dec. 17, 2019

(65) Prior Publication Data

US 2020/0125544 A1 Apr. 23, 2020

Related U.S. Application Data

(63) Continuation of application No. 15/340,416, filed on Nov. 1, 2016, now Pat. No. 10,572,458.

(51) Int. Cl.
*G06F 16/215* (2019.01)
*G06F 16/25* (2019.01)
*G06F 16/23* (2019.01)

(52) U.S. Cl.
CPC ........ *G06F 16/215* (2019.01); *G06F 16/2365* (2019.01); *G06F 16/252* (2019.01)

(58) Field of Classification Search
CPC ... G06F 16/215; G06F 16/252; G06F 16/2365
See application file for complete search history.

(56) References Cited

U.S. PATENT DOCUMENTS

| | | | |
|---|---|---|---|
| 5,860,069 | A | 1/1999 | Wright |
| 6,678,824 | B1 | 1/2004 | Cannon et al. |
| 7,194,451 | B2 | 3/2007 | Chaudhuri et al. |
| 7,206,845 | B2 | 4/2007 | Banning et al. |
| 7,676,692 | B2 | 3/2010 | Costlow et al. |
| 7,720,802 | B2 | 5/2010 | Christenson et al. |

(Continued)

OTHER PUBLICATIONS

Loup Meurice et al., Detecting and Preventing Program Inconsistencies Under Database Schema Evolution, IEEE, 2016, retrieved online on Oct. 23, 2020, pp. 262-273. Retrieved from the Internet :<URL: https://ieeexplore.ieee.org/stamp/stamp.jsp?tp=&arnumber=7589806>. (Year: 2016).*

(Continued)

*Primary Examiner* — Hanh Thi-Minh Bui
(74) *Attorney, Agent, or Firm* — Banner & Witcoff, Ltd.; Michael A. Springs

(57) ABSTRACT

Some aspects disclosed herein are directed to, for example, a system and method of detecting database application incompatibilities. Systems and methods described herein may format traces, collect data, store the data, and/or provide one or more user interface which allows an end user to quickly and easily identify affected statements, such as structured query language (SQL) statements, for remediation action(s).

15 Claims, 7 Drawing Sheets

(56) References Cited

U.S. PATENT DOCUMENTS

| | | | |
|---|---|---|---|
| 7,840,752 | B2 | 11/2010 | Hu et al. |
| 7,873,664 | B2 | 1/2011 | Andersch et al. |
| 8,341,178 | B2 | 12/2012 | Belknap et al. |
| 9,141,526 | B2 | 9/2015 | Iliadis |
| 9,369,389 | B1 | 6/2016 | Weiser et al. |
| 2006/0074872 | A1 | 4/2006 | Gordon |
| 2006/0074956 | A1 | 4/2006 | Marwah |
| 2006/0248080 | A1 | 11/2006 | Gray |
| 2008/0208882 | A1 | 8/2008 | Zhang et al. |
| 2012/0102454 | A1 | 4/2012 | Burghard et al. |
| 2012/0158770 | A1 | 6/2012 | Benadjaoud et al. |
| 2013/0073702 | A1 | 3/2013 | Umbehocker |
| 2013/0185708 | A1* | 7/2013 | Bhat ............... G06F 9/44552 717/170 |
| 2015/0195180 | A1 | 7/2015 | Gaikwad |
| 2016/0188617 | A1 | 6/2016 | Gaikwad |

OTHER PUBLICATIONS

IBM Manual—DB2 10 for z/OS Managing Performance, Nov. 2013, internet http://publib.boulder.ibm.com/?epubs/pdf/dsnpgm09.pdf.
Macro-Name=DSNDQWS1, Descriptive-Name=DB2, Self Defining Section Mapping Macro for Data Base Statistics (IFCID=0002), Licensed Materials—Property of IBM 5635-DB2, Copyright 1982, 2006 IBM Corp., pp. 1-3.
Macro-Name=DSNDQIST, Licensed Materials—Property of IBM 5605-DB2, Copyright 1982, 2010 IBM Corp., pp. 1-7.
Macro-Name=DSNDQW01, Descriptive—Name = IFC Mapping Macro for IFCIDS 0058-0139, Licensed Materials—Property of IBM 5605-DB2, Copyright 1982, 2010 IBM Corp., pp. 1-78.
Macro-Name=DSNDQW04, Descriptive—Name = IFC Mapping Macro for IFCIDS 0250-360, Licensed Materials—Property of IBM 5605-DB2, Copyright 1982, 2010 IBM Corp., pp. 1-108.
IBM Support, "LUWID in the messages—How do I trace the TCP/IP address and port to understand the location/user its corning from;" http://www.-01.ibm.com/support/docsview.wss?uid=swg21055269; Accessed Oct. 3, 2016.
IBM Knowledge Center—IFCID Records Blocks—https://www.ibm.com/support/knowledgecenter/SSUSPA_5.3.0/com.ibm.omegamon.xe.pm_db2.doc_5.3.0/ko2rr/p7ifcidrec.htm; Accessed Sep. 27, 2016.
IBM Knowledge Center—"IFCID 376—Incompatible Functions Executed;" https://www.ibm.com/support/knowledgecenter/en/SSUSPA_5.3.0/com.ibm/omegamon.xe.pm_db2.doc_5.3.0/ko2rr/r0376out.htm; Accessed Sep. 27, 2016.
IBM Knowledge Center—"IFCID 366—Incompatible Functions Executed;" https://www.ibm.com/support/knowledgecenter/en/SSUSPA_5.3.0/com.ibm.omegamon.xe.pm_db2.doc_5.3.0/ko2rr/r0366out.htm; Accessed Sep. 27, 2016.
IBM Knowledge Center; "IFCID 317—SQL Statement String;" https://www.ibm.com/support/knowledgecenter.en/SSUSPA_5.3.0/com.ibm.omegamon.xe.pm_db2.doc_5.3.0/ko2rr/r0317out.htm; Accessed Sep. 27, 2016.
IBM Knowledge Center; Declare Global Temporary Table Statement—http://www.ibm.com/support/knowledgecenter/SSEPGG_9.7.0/com.ibm.db2.luw.sql.ref.doc/doc/r0003272.html; Accessed Oct. 3, 2016.
IBM Knowledge Center—DB2 Automation Tool V.4.1—WTO Messages; http:www.ibm.com/support/knowledgecenter/SSAUWB_4.1.0/com.ibm.db2tools.haa41.doc.ug/topics/haauref_wto.htm; Accessed Oct. 3, 2016.
IBM Knowledge Center—MAX TEMP STG/AGENT Field (MAXTEMPS Subsystem Parameter—http://www.ibm.com/support/knowledgecenter/SSEPEK_10.0.0/inst/src/tpc/db2z_ipf_maxtemps.html; Accessed Oct. 3, 2016.
IBM Support—II14587:DB2 V9, V10 & V11 Workfile Recommendations—http://www-01.ibm.com/support/docview.wss?uid=isg1II14587; Accessed Sep. 27, 2016.
Installation and Migration Guide—DB2 11 for z/OS; IBM Corporation; Sixth Edition (Aug. 2014).
IBM—DB2 Help (Application ID); https://www1.columbia.edu/sec/acis/db2/db2help/db2h2102.htm; Accessed Oct. 3, 2016.
IBM Knowledge Center—IFCID 002—DB2 Statistics—Accessed Nov. 9, 2016; http://www.ibm.com/support/knowledgecenter/SSUSPA_5.3.0/com.ibm.omegamon.xe.om_db2.doc_5.3.0/ko2rr/r0002intro.htm.
IBM Knowledge Center—IFCID 258—Data Set Extend Activity—Accessed Nov. 9, 2016; http://www.ibm.com/support/knowledgecenter/SSUSPA_5.3.0/com.ibm.omegamon.xe.pm_db2.doc_5.3.0/ko2rr/r0258out.htm.
IBM Knowledge Center—IFCID 342—WF/TEMP DB Usage—Accessed Nov. 9, 2016; http://www.ibm.com/support/knowledgecenter/SSUSPA_5.3.0/com.ibm.omegamon.xe.pm_db2.doc_5.3.0/ko2rr/r0342out.htm.
IBM Knowledge Center—DB2 10—Installation and Migration—Accessed Nov. 9, 2016; http://www.ibm.com/support/knowledgecenter/SSEPEK_10.0.inst/src/tpc/db2z_ipf_librarynameprefix.html.
Jan. 22, 2019—(US) Office Action—U.S. Appl. No. 15/340,416.
Jun. 20, 2019—(US) Final Office Action—U.S. Appl. No. 15/340,416.
Oct. 23, 2019—(US) Notice of Allowance—U.S. Appl. No. 15/350,775.
Oct. 20, 2019—(US) Notice of Allowance—U.S. Appl. No. 15/340,416.
Christain Inzinger et al., Identifying Incompatible Service Implementations using Pooled Decision Trees, ACM, 2013, retrieved online on Oct. 27, 2019, pp. 485-492. Retrieved from the Internet: <URL:http://delivery.acm.org/10.1145/24900008/2480456/p485-inzinger.pdf?>. (Year: 2013).
Venkatesh-Prasad Ranganath et al., Compatibility Testing using Patterns-based Trace Comparison, ACM, 2014, retrieved online on Oct. 27, 2019, pp. 469-478. Retrieved from the Internet: <URL:http://delivery.acm.org/10.1145/2650000/2642942/p469-ranganath.pdf?>. (Year: 2014).

* cited by examiner

Database Application Incompatibilities Reporting Tool
400

Select an interface : D

S : Static SQL Incompatibilities
D : Dynamic SQL Incompatibilities

Contact FirstName.LastName@_____.com for queries/suggestions

FIG. 4

Database Application Incompatibility Reporting Tool

Command ===>  
Commands ===> SHOWINFO Show incompatibility information  
Scroll ===> CSR Enter below values to generate report:

| Column Name | | Filter | Breakdown |
|---|---|---|---|
| | | | |
| 505 | Period Start Date | YYYY/MM/DD | Y |
| | End Date | YYYY/MM/DD | |
| 510 | SSID Name | ABCD | Y |
| 515 | User ID | * | Y |
| 520 | Application ID | * | Y |
| | Coll ID | * | Y |
| | Package | * | Y |
| | Version | | Y |
| 525 | Statement ID | * | Y |
| 530 | Statement Type | Dynamic | |
| 535 | Incompatibility Type | * | Y |

*unique ID assigned to each unique SQL statement

Database Application Incompatibility Reporting Tool

```
Command    ===>                                           Scroll ===> CSR
Commands   ===> SORT N Sort on Nth Column
Actions ===> D Show Record  Q Show SQL Text    F Show Formatted SQL Text
```

Application Incompatibility Report                                       Row 1 of 72

| ExcpCnt | YYMMDD | SSID | UserID | Application ID | Coll ID | Package | Version | Statement # | Func |
|---|---|---|---|---|---|---|---|---|---|
| --01-- | --02-- | --03-- | --04-- | --05-- | --06-- | --07-- | --08-- | --09-- | --10-- |
| 1 | YYMM07 | ABCD | User_1 | Application_1 | EFGHI | Package_27 Statement ID: 123456ABCDEF1 | V_2 | 000000 | 1 |
| 1 | YYMM07 | ABCD | User_1 | Application_1 | EFGHI | Package_27 Statement ID: 123456ABCDEF2 | V_2 | 000000 | 1 |
| 1 | YYMM07 | ABCD | User_1 | Application_1 | EFGHI | Package_27 Statement ID: 123456ABCDEF4 | V_2 | 000000 | 1 |
| 1 | YYMM08 | ABCD | User_1 | Application_1 | EFGHI | Package_27 Statement ID: 123456ABCDEF9 | V_2 | 000000 | 1 |
| 1 | YYMM08 | ABCD | User_1 | Application_1 | EFGHI | Package_27 Statement ID: 123456ABCDEF6 | V_2 | 000000 | 1 |
| 1 | YYMM08 | ABCD | User_2 | Application_1 | EFGHI | Package_37 Statement ID: 123456ABCDEF5 | V_2 | 000000 | 1103 |
| 1 | YYMM08 | ABCD | User_3 | Application_1 | EFGHI | Package_90 | V_5 | 000000 | 1103 |

```
Command ===>                                           Scroll ===> PAGE
******** ************************** Top of data ***************************
000001    SELECT MKT_SGMT     INTO :H:H   FROM T_PARTY_OTH_INFO_HIST   WHERE PART
000002    Y_KY    =:H:H                AND LAST_UPDT_TS BETWEEN :H:H AND :H:H   ORDER BY LA
000003    ST_UPDT_TS DESC                      FETCH FIRST 1 ROW ONLY
******** ************************ Bottom of data *************************
```

METHOD AND APPARATUS OF COLLECTING AND REPORTING DATABASE APPLICATION INCOMPATIBILITIES

CROSS REFERENCE TO RELATED APPLICATION

This patent application is a continuation of U.S. patent application Ser. No. 15/340,416 filed Nov. 1, 2016 entitled "Method and Apparatus of Collecting and Reporting Database Application Incompatibilities". This application claims priority to and the benefit of the above-identified application which is fully incorporated by reference herein in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used to detect database application incompatibilities.

BACKGROUND

New features and changes to how one or more functions behave may be introduced in each new database management release. This could potentially impact existing applications that are using functions of a prior release. Traces to identify the affected statements may be provided, but the data might not be able to be used directly by the end user. For example, existing trace data might only show a statement number, but not the statements themselves.

When the new version of database management is released, database management may tolerate the old unsupported functions of a prior release with a flag option to tell database management that database management is to tolerate unsupported functions of a previous release. When the flag to tolerate the supported functions is set, it may prevent users from using new functionalities and features supported by the newer release. The next release or later releases may stop tolerating the old unsupported functions. The sooner old unsupported functions are removed, the sooner users can enjoy the new features of database management.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects as disclosed herein are directed to, for example, a system and method of detecting and presenting database application incompatibilities. In some aspects, systems and methods described herein may format traces, collect data, store the data, and/or provide one or more user interface which allows an end user to quickly and easily identify affected statements (e.g., structured query language (SQL) statements) for remediation action(s).

Aspects described herein are directed to, for example, a system and method comprising initiating, by a computing device, one or more traces configured to detect instances of incompatible data occurring in an application. The one or more traces may monitor for instances of incompatible data occurring in the application. The computing device may detect, via the one or more traces, an instance of incompatible data occurring in the application. In response to detecting the instance of the incompatible data occurring in the application, the method may comprise determining a statement type of the instance of the incompatible data occurring in the application. Based on the determined statement type, a statement associated with the instance of the incompatible data occurring in the application may be retrieved. The computing device may send application identification details and the statement associated with the instance of the incompatible data occurring in the application for storage in a database.

In some aspects, the one or more traces may comprise an Instrumentation Facility Component Identifier (IFCID) trace 366. The IFCID trace 366 may be configured to detect each occurrence of an incompatibility occurring in the application. Additionally or alternatively, the one or more traces may comprise an Instrumentation Facility Component Identifier (IFCID) trace 376. The IFCID trace 376 may be configured to detect a single occurrence of a plurality of incompatibilities occurring in the application.

In some aspects, the incompatible data may comprise one or more of an incompatible timestamp, an incompatible decimal number, or an incompatible function, and the instance of the incompatible data may comprise (e.g., be produced by) the application using one or more of the incompatible timestamp, the incompatible decimal number, or the incompatible function.

In some aspects, the statement type may comprise a static structured query language (SQL) statement. Moreover, retrieving the statement associated with the instance of the incompatible data occurring in the application may comprise retrieving, from a catalog table, the static SQL statement associated with the instance of the incompatible data occurring in the application.

In some aspects, the statement type may comprise a dynamic structured query language (SQL) statement. Moreover, retrieving the statement associated with the instance of the incompatible data occurring in the application may comprise retrieving, from a statement cache, the dynamic SQL statement associated with the instance of the incompatible data occurring in the application. The computing device described herein may generate a hash value associated with the dynamic SQL statement. The computing device may send the hash value and text associated with the dynamic SQL statement for storage in the database.

BRIEF DESCRIPTION OF THE DRAWINGS

The present disclosure is illustrated by way of example and not limited in the accompanying figures in which like reference numerals indicate similar elements and in which:

FIG. 4 illustrates an example user interface for presenting database application incompatibilities in which various aspects of the disclosure may be implemented.

FIG. 5 illustrates an example user interface for presenting database application incompatibilities in which various aspects of the disclosure may be implemented.

FIG. 6 illustrates an example user interface for presenting database application incompatibilities in which various aspects of the disclosure may be implemented.

FIG. 7 illustrates an example user interface for presenting database application incompatibilities in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
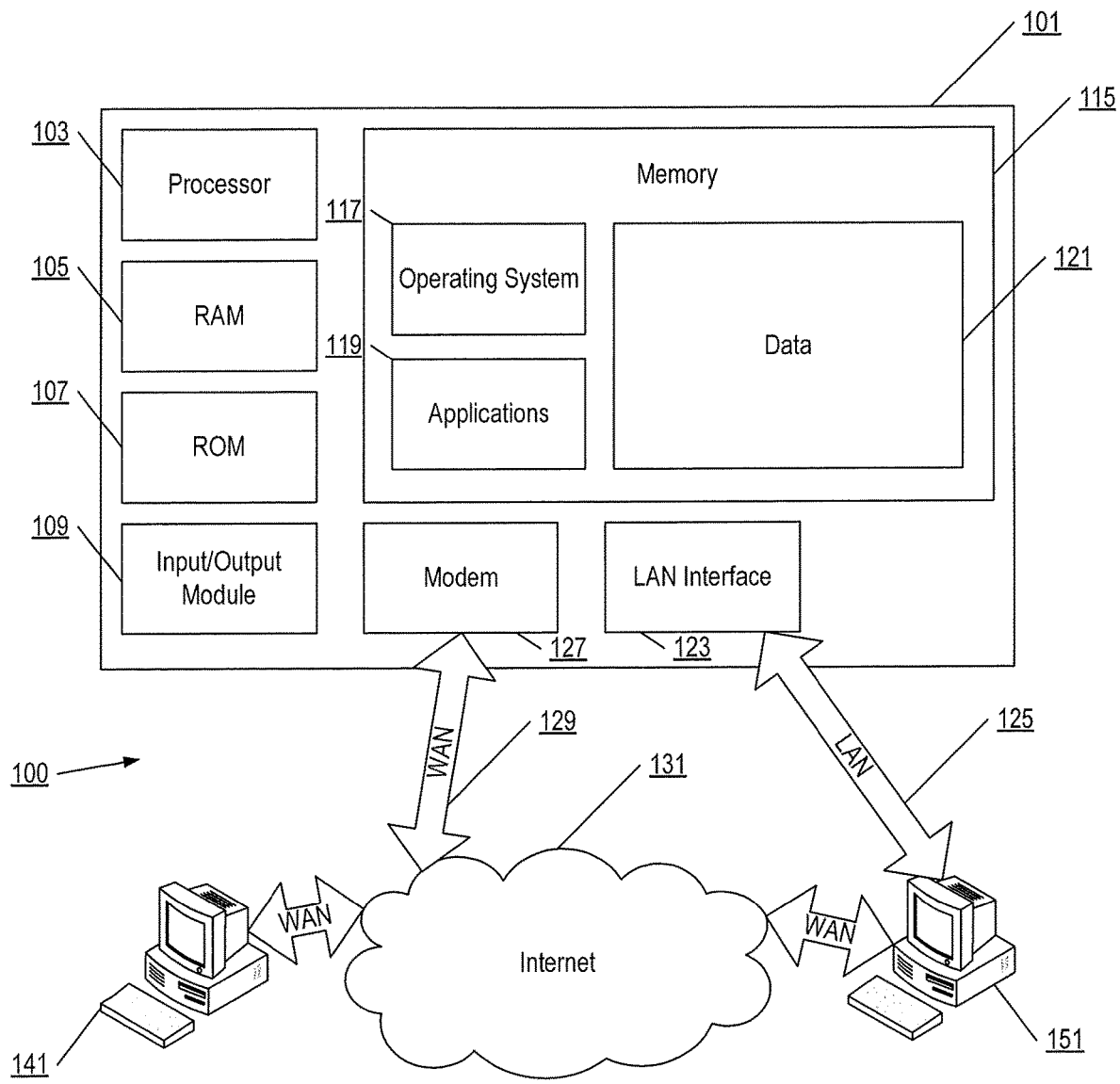
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, other mobile devices, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, and the like) including various other components, such as a battery, speaker, and antennas (not shown).

Figure 2:
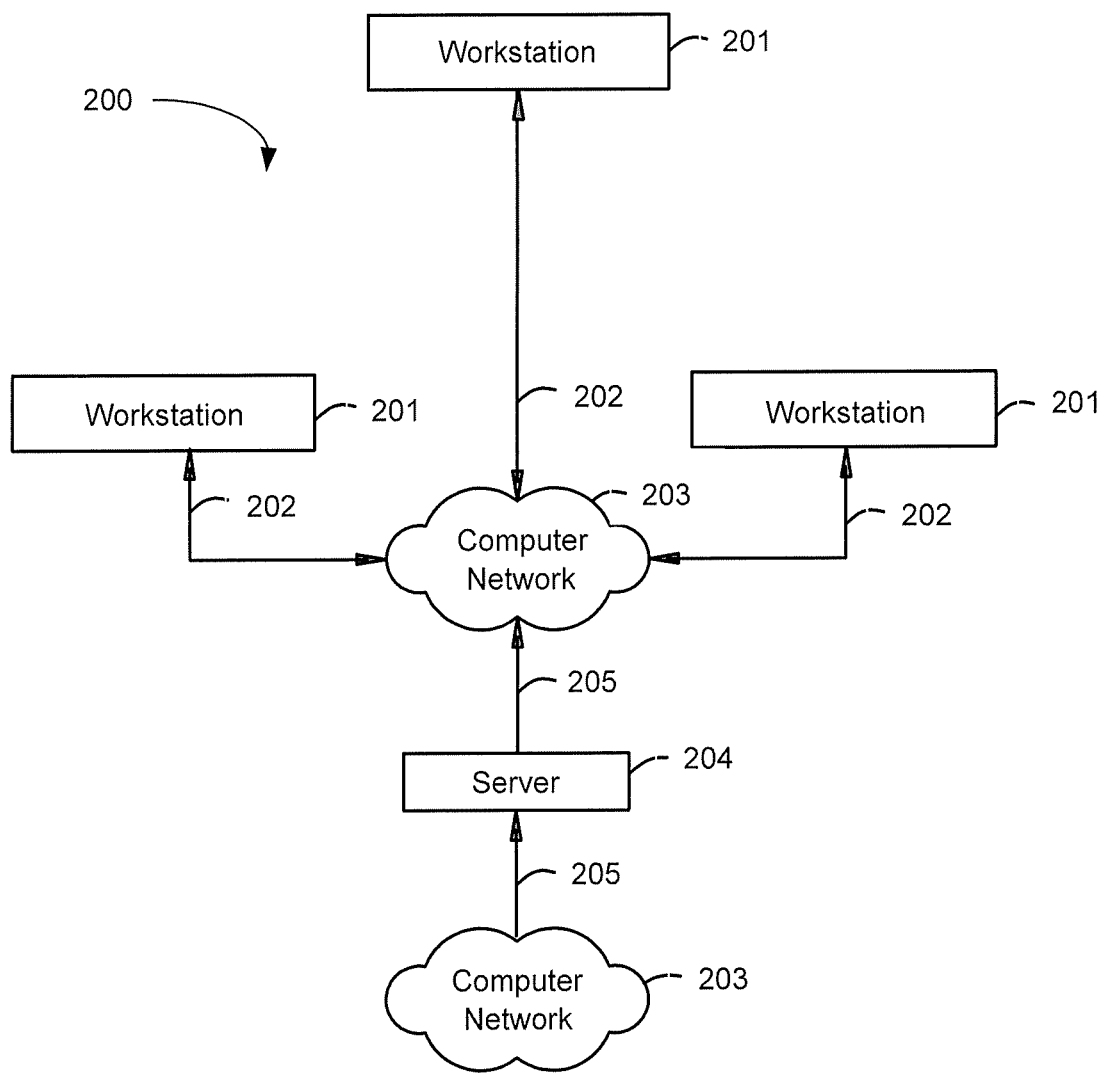
FIG. 2 illustrates another example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. The workstations 201 may be used by, for example, agents or other employees of an institution (e.g., a financial institution) and/or customers of the institution. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Aspects described herein include a monitor task, a set of batch jobs, a database for storing data, and/or a user interface for returning results. An application incompatibility detection monitor task may start a trace (e.g., a DB2 trace) for reporting application incompatibility. There may be an additional option to start another trace to collect one or more (e.g., all) occurrences of the incompatible SQL. When an incompatible SQL executes, the system may create one or more trace records (based on the traces started) and pass the records on to the application incompatibility detection monitor. The monitor may format the traces and inspect one or more fields within the trace record. Depending upon certain fields, it may then extract the SQL statement from the database catalog (e.g., DB2 catalog) or from database dynamic cache using another trace. The monitor may then externalize the data in a file, which may be loaded into a database (e.g., DB2) table. This database table may be queried through a user interface. When an end user requests data through this user interface, the user may receive details which may be used to identify and remediate the reported SQL statements, such as authentication ID, application ID, collection ID, package name, SQL statement, and others.

Aspects described herein may significantly reduce end user time and effort in identifying incompatible statements (e.g., SQL statements). Moreover, one or more of the processes described herein (e.g., from data collection to end user presentation or other steps) may involve multiple areas of technical expertise in mainframe database technologies (e.g., operating systems, database programming languages, assembly language, statistical analysis programming languages, user interface systems, and the like). Aspects described herein may enable seamless and efficient integration of one or more of these technical areas. As will be described in further detail below, the system may analyze trace data to detect incompatible SQL statements.

Figure 3:
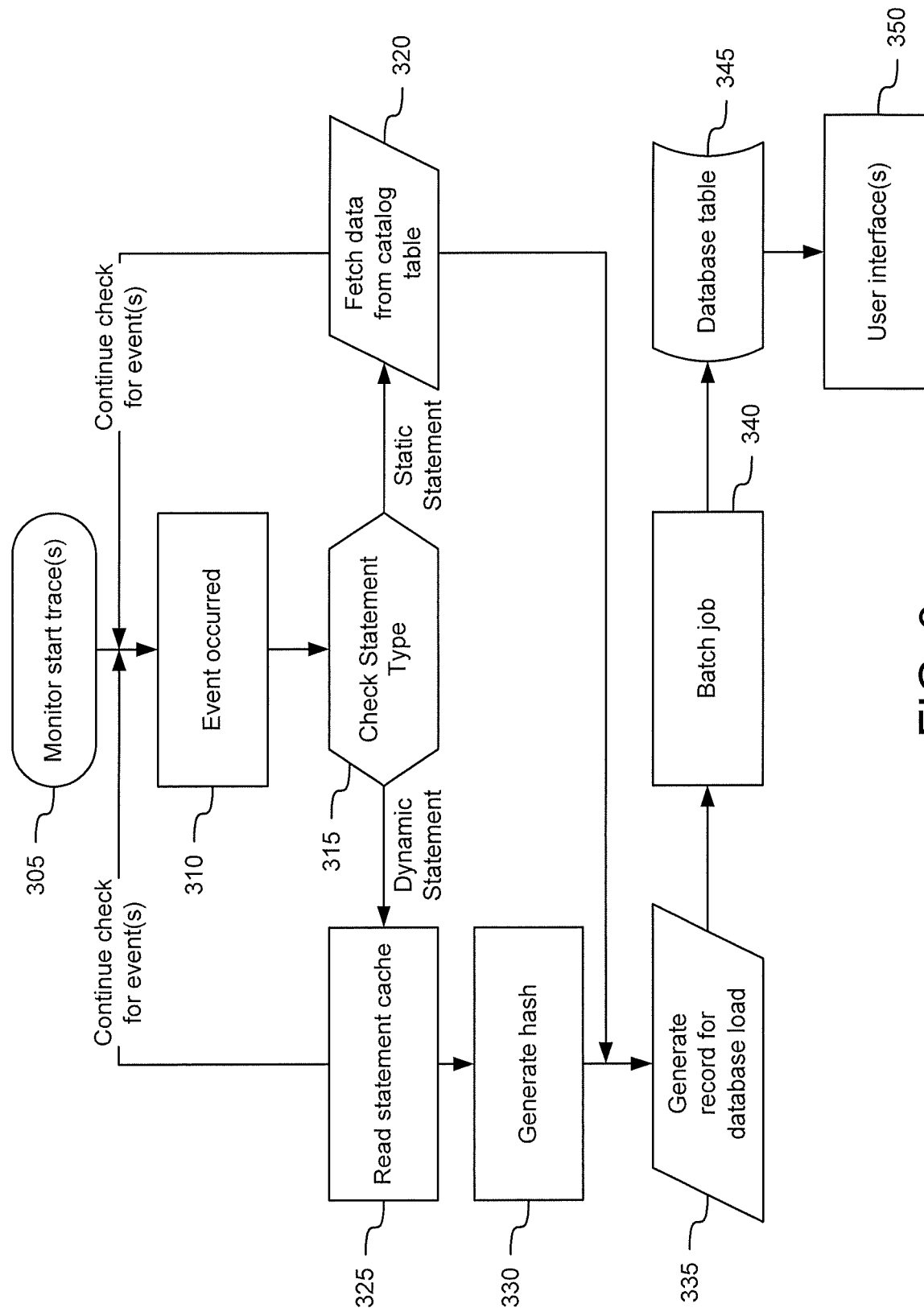
FIG. 3 illustrates an example method for detecting and presenting database application incompatibilities in which various aspects of the disclosure may be implemented.

FIG. 3 illustrates an example method for detecting and presenting database application incompatibilities in which various aspects of the disclosure may be implemented. One or more of the steps illustrated in FIG. 3 may be performed by a computing device as described herein.

In step 305, the computing device may start one or more monitor task and/or trace to detect and/or report incompatibilities. Traces may be used to detect activities within a database management system, such as to determine the amount of data accessed, how the database processes a request, and the like. For example, a user may run 10 different processes, and one trace may indicate to the system that 10 processes were run, and another trace may indicate to the system that one or more of the processes, queries, and the like, were not compatible with the new database system release. Numerous other traces may be used. The system may access data from the traces and reformat the data into a displayable format, as will be described in further detail below.

One type of trace used to monitor activity may be an Instrumentation Facility Component Identifier (IFCID) trace 366. The trace 366 may capture one or more (e.g., all) occurrences of incompatibility, such as all occurrences of an incompatible SQL, even if the incompatible SQL is run by the same application. That is, if a user runs an application having an incompatible SQL and runs the same application again, the trace 366 may report both occurrences of incompatibilities, even though they occur via the same application. Similarly, if the user runs the application with the incompatible SQL a third time, the trace 366 may generate another report for the third instance of the incompatibility.

Another type of trace used to monitor activity may be IFCID trace 376. The trace 376 may capture, for example, a single occurrence of a plurality of incompatibilities if the incompatibilities occur via the same application. For example, the trace 376 may report an incompatibility that occurs while an application is running. The second time the application is run (and the same incompatibility occurs), the trace 376 might not report the second incompatibility. As will be described below, the trace 376 may be used to detect static statement incompatibilities.

In step 310, the computing device may determine that an event occurred. For example, the computing device may determine that an action or data entry in the database (e.g., made by a user) is incompatible with the new version of the database management system. Incompatibilities with SQLs that a user is running may occur, which may lead to a process failing during runtime. For example, certain types of timestamps (or characters in the timestamps) may be incompatible with the system. If the database system uses dots (decimal points) to separate hours, minutes, seconds, milliseconds, and the like, timestamps that use colons instead of dots may be incompatible with the database system. For example, a timestamp with the format "2016-06-08-08:56:37.000286" (which may be acceptable in a previous version of database management) might no longer be acceptable in the new version if it is not a recognized format. As another example, a character (e.g., CHAR) function may no longer return leading zeros or a trailing decimal point for a decimal input value. This may lead to failures to an application which expects the output to have leading zeros or a trailing decimal point. For instance, the user can pass the decimal value of 0.1 as input to the character function that would have returned 0.1 in the earlier version. However, in the new version, the system may return 0.1. This can lead to an error if the application does not handle the output without leading zeros. Numerous other types of incompatibilities exist, and each type of incompatibility may be identified by a unique incompatibility identifier.

In step 315, the computing device may determine the statement type of the detected event. The statement may be static or dynamic. In a static statement, the statement (e.g., an SQL statement) may be created in advance. Static statements might not change, unless, for example, an application is updated. In a dynamic statement, on the other hand, the SQL statement may be created on the fly, and may change. One or more traces may include one or more flags used to identify whether a statement is static or dynamic. For example, if a flag bit is set, the computing device may determine that the statement is static. If the statement is static, the statement might not change, and the computing device may proceed to step 320. If the flag bit is not set, the computing device may determine that the statement is dynamic. If the statement dynamic, the computing device may proceed to step 325.

In step 320, the computing device may fetch data associated with the static statement from a catalog table. When a static statement (e.g., static SQL statement) is created, it may go through a process (e.g., a bind process) resulting in the statement getting stored in the catalog. In some aspects, a trace might not be used to read the static statement from the catalog. Instead, a simple SQL may be used.

In step 325 (and for a dynamic statement), the computing device may read a statement cache associated with the dynamic statement. The computing device may start one or more additional traces to read the statement cache. For example, trace 317 may be used to read dynamic statement data from a statement cache (e.g., step 325).

In step 330, the computing device may generate one or more hash of the dynamic statement, which may benefit the end user. After reading the statement cache in step 325, the computing device may perform hashing of the dynamic statement. A hash value may comprise a unique identifier for the dynamic statement. If the hash value for two dynamic statements is the same, the system may determine that the incompatibility for the same statement occurred. On the other hand, if the hash value for two dynamic statements is different, the system may determine that different incompatibilities occurred. In some aspects, hashing may be used to identify the same statements. These statements may be grouped together, and the same incompatibility fix may be applied to all of the statements grouped together, saving processing time and resources to fix incompatibilities.

Hashing may be performed to identify dynamic statements uniquely. For example, a same dynamic statement that is executed by two different users may have two different statement numbers. A same dynamic statement may have two different statement numbers under two different database systems. A same dynamic statement may get a different statement number when a database is restarted. A same dynamic statement may have two different statement numbers when two different input values are provided.

DB2 trace 376 may identify the same statement in plurality, but it may use the statement number to identify the unique statement. As described in the above scenarios, the same statement may get two different statement numbers. Thus even with IFCID 376, the trace may collect more than one record for the same dynamic statement. Hashing may be performed to identify the same dynamic statement, even when they have different statement numbers. For example, a trace may collect one million (or even more) records for the same dynamic statement as it gets different statement numbers due to one or more scenarios explained above. It may become tedious for users to check all one million records to find the dynamic statements involved to determine if all of them comprise the same dynamic statement.

With hashing, the system can easily help users to determine that all of the one million records belong to the same dynamic statement. Once the user fixes the identified dynamic statement, all one million of those incompatibility records may also be fixed.

In step 335, the computing device may generate a record for each incompatibility. The computing device may gather those records to be included in a database table (e.g., a DB2 table) used to track database incompatibilities.

In step 340, the computing device may trigger a batch job (which may be scheduled, such as every day) that may load the data gathered in step 335 into one or more database table 345 (e.g., a DB2 table). The database table may house the data used for a user interface that users may use to read data associated with incompatibilities. In step 350, the computing device may generate one or more user interface(s) for reporting the database incompatibilities. As a result, the system may provide one or more user interfaces so that users and/or administrators may identify incompatibilities for particular applications and remove or fix the incompatibilities, as will be described in further detail below.

FIG. 4 illustrates an example user interface 400 for presenting database application incompatibilities in which various aspects of the disclosure may be implemented. A user may select a particular type of interface to display, such as to display static SQL incompatibilities (S) or dynamic SQL incompatibilities (D).

FIG. 5 illustrates an example user interface 500 for presenting database application incompatibilities in which various aspects of the disclosure may be implemented. The interface 500 may provide various selectable and configurable options for the user. A user may select a date range 505, a database system name 510, a user ID 515, an application ID 520, a statement ID 525, a statement type 530 (e.g., dynamic or static), an incompatibility type 535, among other selectable options. As previously discussed, the incompatibility type may comprise, for example, the type of timestamp supported, the type of decimal numbers supported, and the like.

FIG. 6 illustrates an example user interface 600 for presenting database application incompatibilities in which various aspects of the disclosure may be implemented. The interface 600 may be displayed in response to a user selection to display one or more SQL statement run by the user (or another user), such as from a user selection of one or more of the options illustrated in FIG. 5. The interface 600 may include a column for exception counts 605, which may comprise the number of times the particular incompatibility (e.g., with a unique hash value) was captured or reported on a particular date 610. The number of counts may depend on the type of trace used. For example, a trace 366 may report each and every instance of a program incompatibility. On the other hand, a trace 376 may report one instance of the static statement program incompatibility. For a dynamic statement, the trace 376 might not be able to know if the incompatibility is the same SQL statement because the statement number may be different in some scenarios, and may report the incompatibility once on the user interface with the help of hashing, as previously described. However, the exception count 605 may be incremented each time the incompatibility occurs.

The exception count 605 may comprise an incrementing number. For example, if an application with an incompatibility is run on day 1, IFCID 376 trace may collect a single record. Thus, the computing device may assign a value of 1 to the exception count. If the application is run again on day 3 and the statement number has changed for some reason, IFCID trace 376 may collect one more record for the same statement under the same application, and the computing device may increment the exception count to a value of 2. Additionally or alternatively, the computing device may perform hashing, and the same hash value may be generated for the statement involved in these two incompatibilities because the same statement is involved in both of the incompatibilities. These incompatibilities may be represented as one entry (e.g., one row) on the user interface, rather than as two entries. However, the exception count 605 may display two.

The interface 600 may comprise statement IDs 615 (e.g., statement ID 123456ABCDEF5). The statement ID 615 may comprise the hash value generated by the computing device. As illustrated in FIG. 6, the statement IDs 615 are all different, so all of the illustrated incompatibilities are different. When the same statement receives the same incompatibility multiple times under the same user (e.g., the statement number may have changed), the user interface might display one record for the statement, with the associated hash represented by statement ID 615. Such a user interface may be displayed in response to a selection of the User ID option 515 for breakdown illustrated in FIG. 5. That is, the user interface may be developed such that only one hash is presented based on the breakdown selected in FIG. 5. Exception count 605 may be incremented accordingly.

By consolidating incompatibilities based on hashing, the system (and users) may more quickly and efficiently identify, remove, and/or fix the incompatibilities. This may be beneficial when many users are running into the same incompatibility with the same dynamic statement. Instead of reviewing one million incompatibility statements manually, the computing device may be able to consolidate, via hashing, the same dynamic statements according to the application and/or user. By knowing the unique statement, a fix may be easily performed.

FIG. 7 illustrates an example user interface 700 for presenting database application incompatibilities in which various aspects of the disclosure may be implemented. For example, the interface 700 may display the executed SQL statement and the corresponding incompatibility (e.g., a timestamp incompatibility). In some aspects, the interface 700 may be displayed in response to a user selection of Q "Show SQL Text" from the interface 600.

The interface 700 may display, for example, the SQL statement executed by the application and/or user. The output may indicate which statements have incompatibilities. Accordingly, the user or an administrator may be able to quickly identify the application or processes run, and the user or administrator may be able to see what type of data caused the incompatibilities.

The three lines illustrated in the interface 700 may comprise the SQL statement. For example, the process may include a data fetch from a database table. The SQL statement may comprise an action to select market segment column information from a particular table (e.g., T_PARTY_OTH_INFO_HIST table). However, the interface 700 may indicate that the timestamp is incompatible, and the user may determine what type of time stamp is being used—either colons or dots or a combination of dots and colons. The system or the user may update the process to use the right format for the timestamp. The statement may also comprise passing the timestamp to the following variable: LAST_UPDT_TS Between :H:H and :H:H. The user may identify how the timestamp fields are being populated, such as which import file or table is providing the data, to identify the source of the incompatibility. The user may access the application and determine how the variables are being populated, and whether the timestamps being populated are in the wrong format.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
   initiating, by a computing device, one or more traces configured to detect instances of incompatible data occurring in an application;
   monitoring, by the one or more traces, for instances of incompatible data occurring in the application, wherein the instances of incompatible data lead to a failure to the application during runtime;
   detecting, by the computing device and via the one or more traces, first and second instances of incompatible data occurring in the application;
   obtaining a first statement and a second statement for the first instance and the second instance, respectively, wherein a statement type comprises a dynamic structured query language (SQL) statement, and wherein retrieving a statement associated with an instance of the incompatible data occurring in the application comprises retrieving, from a statement cache, the dynamic SQL statement associated with the instance of the incompatible data occurring in the application;
   generating, by the computing device, a hash value associated with the dynamic SQL statement;
   sending, by the computing device, the hash value and text associated with the dynamic SQL statement for storage in a database;
   when the first statement is associated with a dynamic statement type, generating a first hash value for the first statement;
   when the second statement is associated with the dynamic statement type, generating a second hash value of the second statement;
   when the first and second hash values are equal, grouping the first and second statements together in a group;
   in response to the grouping, applying a same incompatibility fix to all statements in the group.

2. The method of claim 1, wherein the one or more traces comprises a Instrumentation Facility Component Identifier (IFCID) trace 366, and wherein the IFCID trace 366 is configured to detect each occurrence of an incompatibility occurring in the application.

3. The method of claim 1, wherein the one or more traces comprises a Instrumentation Facility Component Identifier (IFCID) trace 376, and wherein the IFCID trace 376 is configured to detect a single occurrence of a plurality of incompatibilities occurring in the application.

4. The method of claim 1, wherein the incompatible data comprises one or more of an incompatible timestamp, an incompatible decimal number, or an incompatible function, and wherein an instance of the incompatible data comprises the application using one or more of the incompatible timestamp, the incompatible decimal number, or the incompatible function.

5. The method of claim 1, wherein a statement type comprises a static structured query language (SQL) statement, and wherein retrieving a statement associated with an instance of the incompatible data occurring in the application comprises retrieving, from a catalog table, the static SQL statement associated with the instance of the incompatible data occurring in the application.

6. An apparatus, comprising:
   a processor; and
   memory storing computer-executable instructions that, when executed by the processor, cause the apparatus to:
      initiate one or more traces configured to detect instances of incompatible data occurring in an application;
      monitor, by the one or more traces, for instances of incompatible data occurring in the application, wherein the instances of incompatible data lead to a failure to the application during runtime;
      detect, via the one or more traces, first and second instances of incompatible data occurring in the application;
      obtain a first statement and a second statement for the first instance and the second instance, respectively, wherein a statement type comprises a dynamic structured query language (SQL) statement, and wherein retrieving a statement associated with an instance of the incompatible data occurring in the application comprises retrieving, from a statement cache, the dynamic SQL statement associated with the instance of the incompatible data occurring in the application;
      generate a hash value associated with the dynamic SQL statement;
   send the hash value and text associated with the dynamic SQL statement for storage in a database;
      when the first statement is associated with a dynamic statement type, generate a first hash value for the first statement;
      when the second statement is associated with the dynamic statement type, generate a second hash value of the second statement;
      when the first and second hash values are equal, group the first and second statements together in a group; and
      in response to the grouping, apply a same incompatibility fix to all statements in the group.

7. The apparatus of claim 6, wherein the one or more traces comprises a Instrumentation Facility Component Identifier (IFCID) trace 366, and wherein the IFCID trace 366 is configured to detect each occurrence of an incompatibility occurring in the application.

8. The apparatus of claim 6, wherein the one or more traces comprises a Instrumentation Facility Component Identifier (IFCID) trace 376, and wherein the IFCID trace 376 is configured to detect a single occurrence of a plurality of incompatibilities occurring in the application.

9. The apparatus of claim 6, wherein the incompatible data comprises one or more of an incompatible timestamp, an incompatible decimal number, or an incompatible function, and wherein an instance of the incompatible data comprises the application using one or more of the incompatible timestamp, the incompatible decimal number, or the incompatible function.

10. The apparatus of claim 6, wherein a statement type comprises a static structured query language (SQL) statement, and wherein retrieving a statement associated with an instance of the incompatible data occurring in the application comprises retrieving, from a catalog table, the static SQL statement associated with the instance of the incompatible data occurring in the application.

11. One or more non-transitory computer-readable medium having instructions stored thereon that, when executed by one or more computing devices, cause the one or more computing devices to:
   initiate one or more traces configured to detect instances of incompatible data occurring in an application;
   monitor, by the one or more traces, for instances of incompatible data occurring in the application, wherein the instances of incompatible data lead to a failure to the application during runtime;
   detect, via the one or more traces, first and second instances of incompatible data occurring in the application;
   obtain a first statement and a second statement for the first instance and the second instance, respectively, wherein a statement type comprises a dynamic structured query language (SQL) statement, and wherein retrieving a statement associated with an instance of the incompatible data occurring in the application comprises retrieving, from a statement cache, the dynamic SQL statement associated with the instance of the incompatible data occurring in the application;
   generate a hash value associated with the dynamic SQL statement;
   send the hash value and text associated with the dynamic SQL statement for storage in a database;
   when the first statement is associated with a dynamic statement type, generate a first hash value for the first statement;
   when the second statement is associated with the dynamic statement type, generate a second hash value of the second statement;
   when the first and second hash values are equal, group the first and second statements together in a group; and
   in response to the grouping, apply a same incompatibility fix to all statements in the group.

12. The one or more non-transitory computer-readable medium of claim 11, wherein the one or more traces comprises a Instrumentation Facility Component Identifier (IFCID) trace 366, and wherein the IFCID trace 366 is configured to detect each occurrence of an incompatibility occurring in the application.

13. The one or more non-transitory computer-readable medium of claim 11, wherein the one or more traces comprises a Instrumentation Facility Component Identifier (IFCID) trace 376, and wherein the IFCID trace 376 is configured to detect a single occurrence of a plurality of incompatibilities occurring in the application.

14. The one or more non-transitory computer-readable medium of claim 11, wherein the incompatible data comprises one or more of an incompatible timestamp, an incompatible decimal number, or an incompatible function, and wherein an instance of the incompatible data comprises the application using one or more of the incompatible timestamp, the incompatible decimal number, or the incompatible function.

15. The one or more non-transitory computer-readable medium of claim 11, wherein a statement type comprises a static structured query language (SQL) statement, and wherein retrieving a statement associated with an instance of the incompatible data occurring in the application comprises retrieving, from a catalog table, the static SQL statement associated with the instance of the incompatible data occurring in the application.

* * * * *

UNITED STATES PATENT AND TRADEMARK OFFICE
CERTIFICATE OF CORRECTION

PATENT NO. : 10,915,510 B2
APPLICATION NO. : 16/716617
DATED : February 9, 2021
INVENTOR(S) : Gaikwad et al.

Page 1 of 1

It is certified that error appears in the above-identified patent and that said Letters Patent is hereby corrected as shown below:

On the Title Page

Page 2, Column 2, Other Publications, Line 41:
Delete "Oct. 20, 2019" and insert --Oct. 30, 2019--

Signed and Sealed this
Eighth Day of June, 2021

Drew Hirshfeld
*Performing the Functions and Duties of the
Under Secretary of Commerce for Intellectual Property and
Director of the United States Patent and Trademark Office*